United States Patent [19]

Destouches et al.

[11] 4,183,325

[45] Jan. 15, 1980

[54] EGG INCUBATOR

[75] Inventors: Bernard M. R. Destouches; Gilbert Esther, both of Mettray, France

[73] Assignee: Bekoto, Mettray, France

[21] Appl. No.: 882,693

[22] Filed: Mar. 2, 1978

[30] Foreign Application Priority Data

Mar. 4, 1977 [FR] France .................. 77 06519

[51] Int. Cl.² .................................. A01K 41/02
[52] U.S. Cl. .................................. 119/37; 119/38
[58] Field of Search .......... 119/37, 38, 36, 35, 119/34, 33, 44

[56] References Cited

U.S. PATENT DOCUMENTS

| 1,911,249 | 5/1933 | Stover | 119/37 |
| 2,203,335 | 6/1940 | Lager | 119/35 |
| 2,319,091 | 5/1943 | Smith et al. | 119/37 |

*Primary Examiner*—Hugh R. Chamblee
*Attorney, Agent, or Firm*—Karl W. Flocks

[57] ABSTRACT

An egg incubator comprises on a front face, at least one door for the introduction thereinto of carriages with drawers containing eggs. Directing-distributing means direct a principal flow of stirring air towards said front face through which at least three series of carriages, of which one is a central series, are introduced into the incubator, and distribute by division, a part of said principal flow onto the series of carriages arranged on both sides of said central series of carriages. Moist air distributing means are constituted by a sort of inverted U whose downwardly directed arms are beneath the flow of stirring air, on the return of the latter, so that said moist air emerging from slots formed in said arms is drawn along by this return flow. It includes a vertical bank of ventilators, and a fresh air intake and temperature regulating unit associated with said vertical bank. The arms of the inverted U are as remote as possible from said unit to facilitate mixing of the return flow with the moist flow intake, before reaching said regulating unit, so that a balanced horizontal flow of stirring air, regulated in humidity and in temperature, is delivered to the group of eggs over the whole height of the incubator without there being any zone of the enclosure of the latter left unreached.

7 Claims, 5 Drawing Figures

EGG INCUBATOR

BACKGROUND OF THE INVENTION

1. Field of the Invention

The present invention relates to an egg incubator capable of receiving, for example, six carriages with drawers with a total capacity of about 20,000 to 21,000 eggs.

It is an object of the invention to provide an incubator in which there is a horizontal flow of stirring air over the whole height of the incubator without any zone thereof being left unreached.

It is another object of the invention to provide an incubator, in which in addition to means enabling a balanced flow of air to be obtained, are also temperature adjusting means and hygrometric degree regulating means.

Other objects and advantages of the invention will appear from the description which follows.

GENERAL DESCRIPTION OF THE INVENTION

The incubator according to the invention comprises:

directing-distributing means for, on the one hand, directing a principal flow of stirring air towards the front face through which at least three series of carriages are introduced into the incubator and, on the other hand, distributing, by division, a part of said principal flow onto the series of carriages arranged on both sides of a central series of carriages;

moist air distributing means constituted by a sort of inverted U of which the vertical arms are beneath the flow of stirring air on the return of the latter, so that said moist air emerging from vertical slots is drawn along by this return flow;

a fresh air intake and temperature regulating unit associated with the vertical bank of ventilators, the arms of the inverted U being spaced as far as possible from this unit to facilitate mixing of the return flow with the injection of moist air, before reaching said regulating unit.

BRIEF DESCRIPTION OF THE DRAWINGS

Other features and advantages of the present invention will emerge from the description which follows made with reference to the accompanying drawings in which.

DESCRIPTION OF A PREFERRED EMBODIMENT

Figure 1:
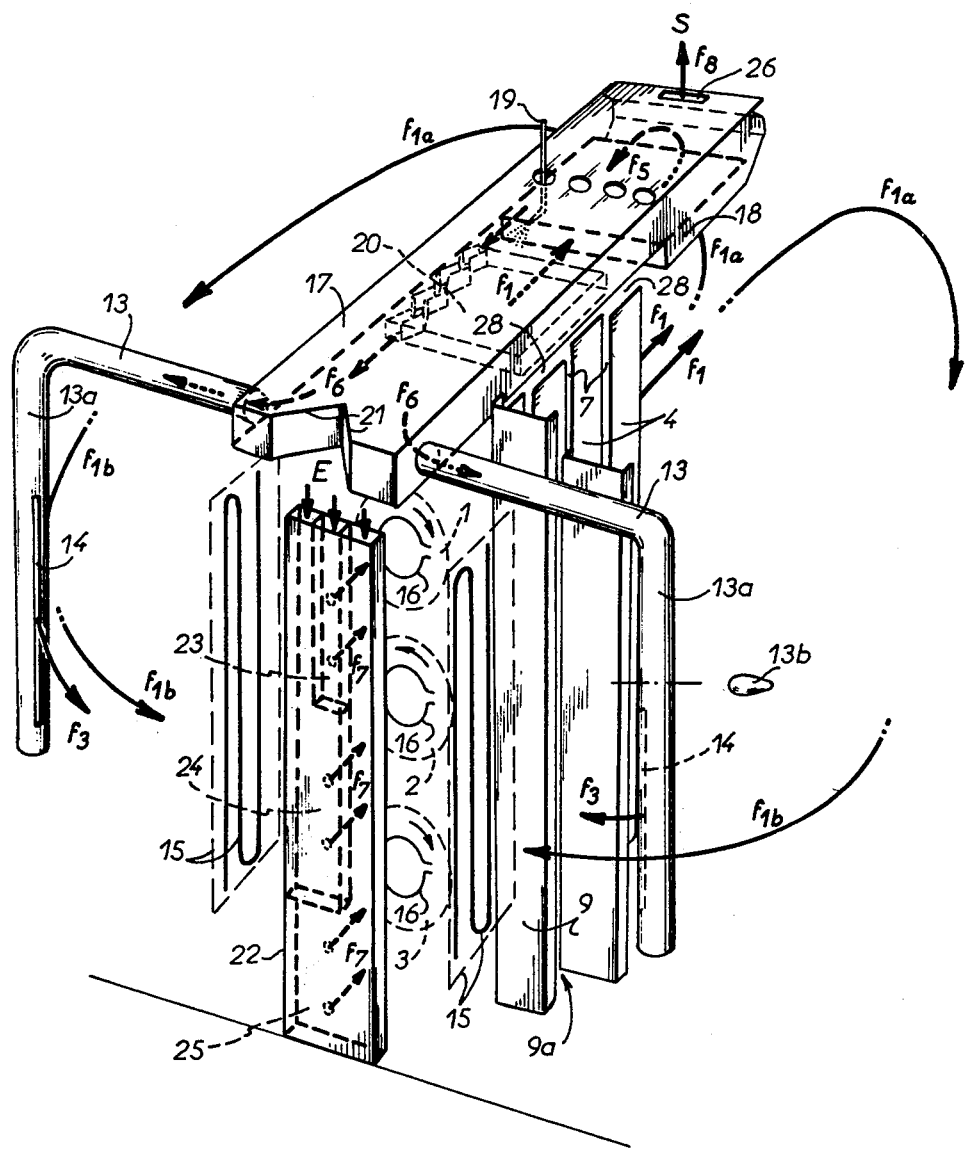
FIG. 1 is a perspective view of an embodiment of an egg incubator according to the invention.
Figure 3:
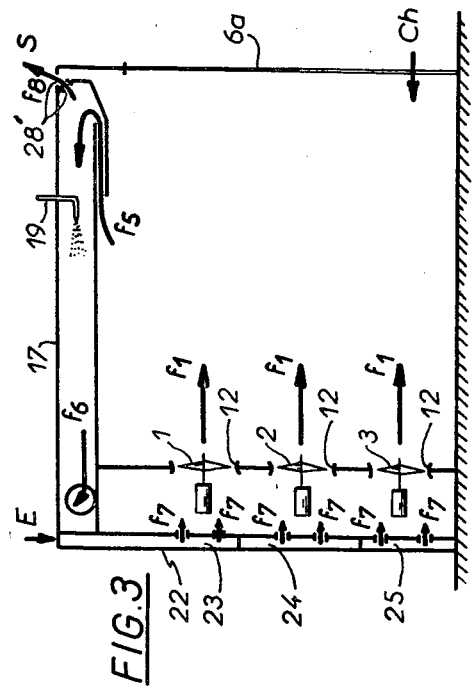
FIG. 3 is a view in longitudinal diagrammatic and partial section of an incubator according to the invention.
Figure 5:
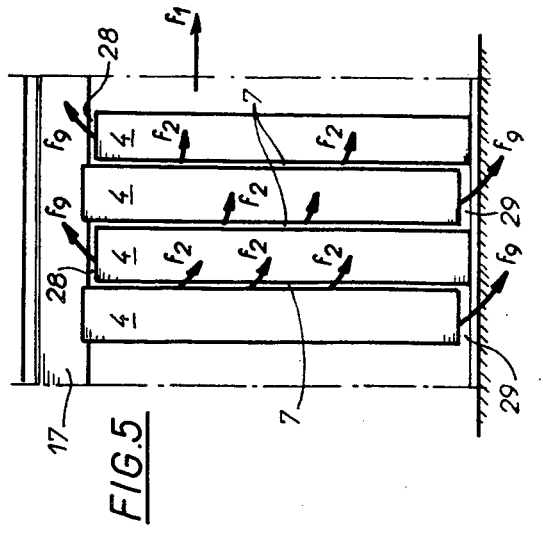
FIG. 5 is a detailed view, on a larger scale, of one of the means forming part of an embodiment of an incubator according to the invention.
Figure 2:
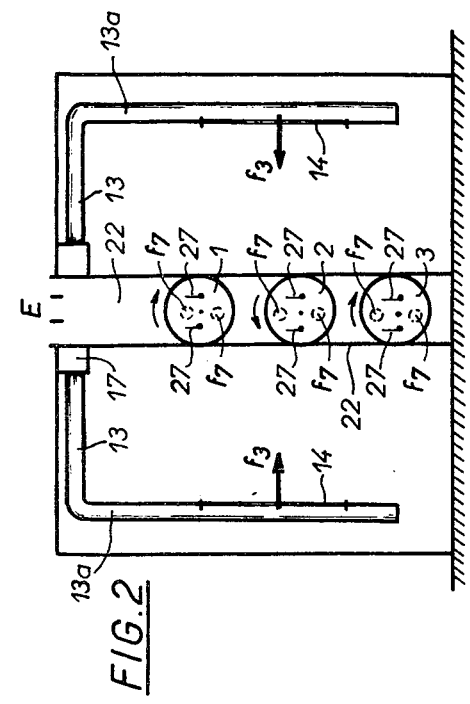
FIG. 2 is a diagrammatic view in side elevation of the incubator of FIG. 1, from the air intake side.
Figure 4:
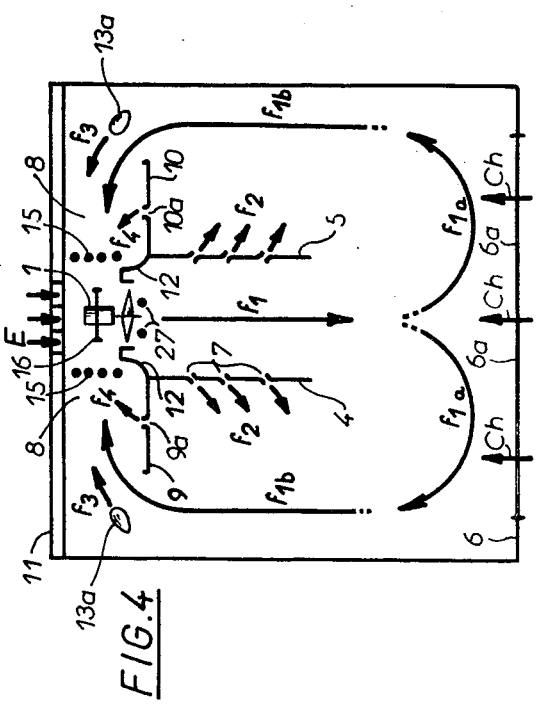
FIG. 4 is a diagrammatic and partial view from above, of an embodiment of an incubator according to the invention.

In the embodiments shown, the incubator according to the invention comprises means for directing and distributing a principal flow of air (arrow $f_1$) emerging from a vertical bank of three ventilators (1—2—3) arranged one above the other.

The directing-distributing means are constituted by two partitions (4 and 5) directing, on the one hand, the flow ($f_1$) towards the front face (6) of the incubator provided with doors 6a through which three series Ch of two carriages each enter and, on the other hand, distributing, by division, (arrow $f_2$), the part of the flow $f_1$ towards the series of carriages Ch arranged on both sides of the central series.

The divisional flows $f_2$ produced by slot 7 whose particularity is to be each wider than the preceding one progressively as the intake face 6 of the incubator is approached. (By reason the scale, this feature is not visible in the drawings).

This arrangement of the partitions 4 and 5, enables a loss of the principal flow $f_1$ to be avoided which has the effect, on the one hand, of suitably ventilating the central series of carriages like the lateral series of carriages and, on the other hand, of avoiding the leaving unreached, due to the flows $f_{1a}$, in particular of the zones of the enclosure of the incubator remotest from the bank of ventilators and hence close to the intake face 6 of the latter.

The stirring flow is continued laterally (arrow $f_{1b}$) to gain, in flowing along the lateral series of carriages, a chamber 8 formed by partitions 9 and 10 parallel to the face 11 of the incubator opposite the face 6 of the latter.

The partition 9 is connected perpendicularly to the partition 4 and the partition 10 is connected perpendicularly to the partition 5.

The ferrules 12 of the ventilators 1—2—3 form the connection with the partitions 9 and 10.

The flows $f_{1b}$ entering the chamber 8 are provided to draw along flows of humidified air $f_3$ emerging from two vent ducts 13 of which the vertical part 13a of each of them forms an aerodynamic profile 13b.

Each vertical part 13a has a vertical slot 14 allowing the flow $f_3$ to pass drawn by the flow $f_{1b}$.

The flows $f_{1b}$ are also provided to create under a suction effect a removal of air $f_4$ through slots 9a and 10a formed in the partitions 9 and 10, with the result of obtaining stirring in the corner zones between the partitions 9 and 4, on the one hand, and 10 and 5, on the other hand.

The air flows $f_3$ encounter, in the chamber 8, cooling panels 15 with a water circulation. Each ventilator is equipped with a circular heating resistance 16.

The bent ducts 13 are coupled to a longitudinal central casing 17 on both sides of the latter to form a sort of inverted U, the arms of the inverted U being spaced as far as possible from the regulating unit to facilitate mixing of the return flow with the injection of moist air before reaching said regulating unit. The casing 17 constitutes a humidity conditioner of the stirring air. To this end, a portion $f_5$ of the principal flow $f_1$ is collected by a box 18 arranged beneath the central casing 17 and communicating with. Inside the casing 17 and flow $f_5$ encounters water sprayers 19 and one only has been shown.

The flow $f_5$ then traverses a unit 20 with baffles acting as an evaporator, the moisture being deposited on the surfaces of the baffles.

At the outlet of this unit, the flow encounters a deflector 21 creating two separate flows $f_6$ each following a bent duct 13.

The principal air intake E is formed by a unit 22 including internally three casings 23-24-25 each emerging (arrow $f_7$) through two orifices, facing a ventilator.

The intake E of the casings can be regulated by flaps, sliders or other means (not shown).

The outlet S of air $f_8$ is formed by an orifice 28' arranged at the end of the casing 17 opposite the deflector 21.

Thermometric probes 27 are arranged downstream of each ventilator.

The whole constituted by the cooling panels, the heating resisters and the probes forms the temperature regulating unit. It must be noted that the partitions 4 and 5 outside of the vertical slots of progressive widths 7 have, in staggered arrangement, other slots, some horizontal and above 28, others horizontal and below 29, to allow other flows $f_9$ emerging from the principal flow $f_1$ to pass, always with a view to flow distribution and balance.

Of course, the series of two carriages (or more) can each be introduced simultaneously or according to a time staggered loading plan.

It will be understood that the present invention has only been described and illustrated by way of preferential example and that equivalent arrangements could be introduced into the constituent elements without, however, departing from the scope of the present invention as defined by the appended claims.

We claim:

1. An egg incubator comprising
    a cabinet having a front face with at least one door thereon;
    at least three series of carriages with drawers to hold eggs introduced into said cabinet through said at least one door and including
        a central series of carriages,
        a side series of carriages arranged on both sides of said central series of carriages;
    means providing a principal flow of air from a rear to front direction in said cabinet,
    directing-distributing means to direct said principal flow of stirring air towards said front face through said central series of carriages and to distribute by division a part of the principal flow to each of said side series of carriages;
    moist air distributing means including
        moisture dispensing means,
        and downwardly directed arms forming an inverted U extending below the flow of stirring air and having slots extending along said arms, to mix moist air into the stirring air flow by drawing the moist air from said slots by the flow movement of the stirring air during a return portion of the flow pattern;
    said means providing a principal flow of air including a vertical bank of ventilators located to cooperate with said directing-distributing means;
    fresh air intake and temperature regulating units associated with said vertical bank of ventilators;
    said arms of said inverted U located remotely from said temperature regulating unit to facilitate the mixing of the return flow with the moist air before reaching said regulating unit so that a balanced horizontal flow of stirring air, regulated in humidity and in temperature, is delivered to the group of eggs over the whole height of the incubator without there being any zone of the enclosure formed by said cabinet left unreached.

2. Incubator according to claim 1, comprising directing partitions, the divisional flows being produced by slots formed in said directing partitions, each slot being wider than the preceding one, progressively as said front intake face of the incubator is approached.

3. Incubator according to claim 1, wherein the vertical arms of the inverted U each have an aerodynamic profile placed below the return flow.

4. Incubator according to claim 1, comprising a central casing collecting a part of the principal flow and a humidity conditioner contained in said central casing, said arms of the inverted U distributing moist air being connected to said central casing.

5. Incubator according to claim 1, wherein the fresh air intake unit comprises vertical casings equal in number to that of said ventilators in said vertical bank of ventilators, the intakes of said casings being regulatable.

6. Incubator according to claim 1, comprising temperature regulation means comprising cooling panels, heating resistances and thermometric probes.

7. Incubator according to claim 1, comprising partitions connected perpendicularly to said directing-distributing partitions and having slots for removing air under a suction effect of the return flow, said fresh air intake and temperature regulating units being separated from the carriages by said partitions connected perpendicularly to said directing-distributing partitions which also have, and this in staggered arrangement, upper and lower slots.

* * * * *